United States Patent
Lohner et al.

(10) Patent No.: US 8,250,968 B2
(45) Date of Patent: Aug. 28, 2012

(54) WORT COPPER WITH AN EXTERNAL BOILER

(75) Inventors: Dietmar Lohner, Freising (DE); Christian Wetzl, Haag (DE); Robert Gruber, Abends/Gemeinde Au (DE)

(73) Assignee: Krones AG, Neutraubling (DE)

( * ) Notice: Subject to any disclaimer, the term of this patent is extended or adjusted under 35 U.S.C. 154(b) by 832 days.

(21) Appl. No.: 12/301,354

(22) PCT Filed: Mar. 6, 2007

(86) PCT No.: PCT/EP2007/001921
§ 371 (c)(1),
(2), (4) Date: Nov. 18, 2008

(87) PCT Pub. No.: WO2007/134657
PCT Pub. Date: Nov. 29, 2007

(65) Prior Publication Data
US 2009/0191321 A1    Jul. 30, 2009

(30) Foreign Application Priority Data
May 23, 2006    (EP) .................................... 06010673

(51) Int. Cl.
*C12C 7/00*    (2006.01)
*C12C 7/20*    (2006.01)

(52) U.S. Cl. ........................................... 99/278; 99/276

(58) Field of Classification Search ................. 426/422; 99/276, 277, 278
See application file for complete search history.

(56) References Cited

U.S. PATENT DOCUMENTS

| 2006/0191418 A1 | 8/2006 | Washmuht et al. |
| 2010/0178385 A1 | 7/2010 | Washmuht et al. |

FOREIGN PATENT DOCUMENTS

| CA | 2234216 | 10/1998 |
| DE | 2535120 | 2/1977 |
| DE | 19634010 | 4/1997 |
| EP | 0875559 B1 | 11/1998 |
| GB | 1383330 | 2/1974 |
| JP | 3047108 A | 2/1991 |
| JP | 2005155552 A | 6/2005 |
| JP | 2006523443 A | 10/2006 |
| WO | WO-2004/092321 | 10/2004 |

OTHER PUBLICATIONS

Holland et al. "Fluids in Motion". Fluid Flow for Chemical Engineers, 2nd Edition, 1995, pp. 1-36.*
Japanese Notice of Reasons for Rejection for Patent Application No. P2009-511348 dated Aug. 9, 2011.

* cited by examiner

Primary Examiner — D. Lawrence Tarazano
Assistant Examiner — Stephanie Cox
(74) Attorney, Agent, or Firm — Marshall, Gerstein & Borun LLP

(57) ABSTRACT

A wort copper and a method of boiling wort, with the wort copper having an external boiler arranged outside of the wort copper, which cyclically heats wort from the wort copper, wherein the heated wort is re-supplied to the wort copper, and comprises an infeed tube and a rising pipe, through which wort heated by the external boiler rises upwards in the wort copper, as well as at least one intake opening is provided in the rising line for sucking in wort from a wort reservoir of the wort copper, wherein the cross-sectional surface of the rising pipe enlarges at least section-wise towards the upper end of the rising pipe.

17 Claims, 5 Drawing Sheets

WORT COPPER WITH AN EXTERNAL BOILER

CROSS-REFERENCE TO RELATED APPLICATION

The present application claims the benefit of priority of International Patent Application No. PCT/EP2007/001921, filed on Mar. 6, 2007, which application claims priority of German Patent Application No. 06010673.9, filed May 23, 2006. The entire text of the priority application is incorporated herein by reference in its entirety.

FIELD OF THE DISCLOSURE

The present disclosure refers to a wort copper with an external boiler as well as a method of boiling wort.

BACKGROUND

An essential process in brewing is the brewing house process for producing wort. The wort produced by the lauter tub must be boiled, wherein bitter and aromatic components of the hops are transferred into the wort and at the same time proteins as well as undesired volatile components, such as DMS (dimethylsulfide) can be eliminated or evaporated.

The boiling of wort is carried out in a wort copper. Basically, wort coppers with internal boilers and wort coppers with external boilers exist. In the case of wort coppers with internal boilers, the boiler is located in the wort copper. The internal boiler is for instance a tubular heat exchanger located in the wort copper, with the wort rising through its perpendicularly arranged tubes.

In the case of wort coppers with external boilers, the wort is heated by an external boiler arranged outside of the copper. The wort is permanently drawn off from the lower portion of the wort copper and is for instance pumped by means of a pump through the external boiler and is re-supplied to the wort. During return into the copper the wort expands. This leads to a desired strong evaporation. Usually, tubular heat exchangers or plate heat exchangers are used as external boilers. Contrary to internal boilers, external boilers reveal a number of advantages. The wort outlet temperature and circulation quantity can be controlled precisely. The heating surface required and the dimensioning of the external boiler is freely selectable and not restricted by the size of the copper. The size of the wort copper can therefore be reduced.

The wort copper with an external boiler still involves the disadvantage that the wort stock in the wort copper does not circulate sufficiently. Although the circulating pump is dimensioned such that the copper content can be circulated approximately eight times per hour, however, it is not ensured thereby that each wort particle runs eight times through the boiler. A sufficient circulation is particularly not guaranteed in the lower portions and corner portions of the wort copper.

Problems particularly during phase boiling result, which is the prerequisite for an energy-saving wort boiling. During phase boiling the efficiency of the circulating pump and/or the heating power of the boiler during the heating and boiling process is for instance controlled and adapted to a target value curve, as for instance explained in EP 0875559 B1. The boiling process is carried out in various phases, wherein the heating power of the wort boiler depends on a difference between the target and actual value. Particularly in the phases in which the heating power is low or it is not heated at all, the problem occurs that the copper content is not sufficiently circulated, since caused by the lowered heating power the relief energy of the heated wort is not sufficient to provide a good circulation.

On the whole, a high pump efficiency is required in the known wort coppers and wort boiling methods, which leads to a throughput speed of approx 2 to 3 m/sec in the external boiler tubes, since otherwise crustification occurs.

It was also already proposed, as shown in FIG. 7, that the wort heated by an external boiler is supplied through an infeed tube which projects into a rising pipe. However, it was also proven in this system that a sufficient circulation of the wort does particularly not occur in phase boiling.

SUMMARY OF THE DISCLOSURE

Starting out from this, it is the object of the present disclosure to provide a wort copper and a respective method, which enable an improved circulation of the wort in the wort copper even in the phase boiling process.

Since at least one intake opening is provided according to the disclosure between the infeed tube and the rising pipe, said opening autonomously taking in the wort from a wort reservoir of the wort copper, the wort may rise upwards from the wort reservoir together with the wort heated by the external boiler from the copper bottom and it may run down to the upper end of the rising pipe onto the surface of the wort reservoir so that a sufficient circulation of the wort in the wort reservoir is guaranteed. The wort copper according to the disclosure therefore comprises two circulation cycles, wherein on the one hand wort from the wort reservoir is supplied to the external boiler and the heated wort is supplied to the wort reservoir via the inlet tube and the rising pipe, and on the other hand, in a further cycle, wort from a wort reservoir rises upwards together with the heated wort via the at least one intake opening. The intake is amongst others implemented due to the static vacuum pressure in the liquid flowing through the rising pipe and due to the expansion of the heated wort.

Caused by the improved circulation in the wort copper, the delivery rate of the circulation pump can also be lowered, said pump supplying wort from the wort reservoir to the external boiler, which again is returned to the wort copper and thereby the heating power can be lowered.

According to the disclosure, undesired aromatic components and particularly DMS can especially well be eliminated.

According to the disclosure, the cross-sectional surface of the rising pipe above the at least one intake opening opens at least section-wise towards the top. Caused by the expansion of the rising pipe, the rising wort may expand, which further enhances the circulation of the wort from the wort reservoir into the intake openings. Caused by the circulation, an even better circulation is possible, particularly in the case of unheated phases if a sufficient thermal expansion energy does not exist.

According to the disclosure, the upper end of the infeed tube abuts at the lower end portion of the rising pipe in a manner that the at least one intake opening is formed between the infeed tube and the rising pipe. The fact that the infeed tube abuts at the lower end portion of the rising pipe may mean that the upper end of the infeed tube and the lower end of the rising pipe are arranged substantially on one plane. However, this can also mean that the upper end of the intake pipe slightly projects into the lower end portion of the rising pipe or is slightly spaced apart. Thus, the at least one intake opening is formed between the lower end of the rising pipe and the outer wall of the infeed tube or the lateral end portion.

The rising pipe advantageously has a collar at the lower end, said collar expanding towards the bottom, i.e. that the expanding collar encompasses the infeed tube in the lower area.

The rising pipe advantageously has a downwardly expanding lower section, e.g. a cylindrical section and an upper section, whose cross sectional surface enlarges towards the upper end of the rising pipe. This arrangement leads to the advantage that the wort, which is sucked in through the intake openings into the rising pipe, can flow into the non-expanding section at a high speed, which in turn leads to a high dynamic pressure. This portion is followed by the expanding section in which the dynamic pressure and thus the flow speed decreases, wherein the wort expands. The combination of the non-expanding section and the expanding section enables an ideal intake of the wort from the wort reservoir through the at least one intake opening into the rising pipe, even if the external boiler temperature is low.

The upper section is preferably formed as a conically tapering tube, whose external wall is included at an angle $\beta$ of 5 to 15°, preferably 6 to 10° with respect to the center axis L of the rising pipe.

The infeed tube has a lower cross-sectional surface at its upper end than the lower end of the rising pipe.

It is advantageous if the ratio of the diameter D1 of the infeed tube at its upper end to the diameter D2 at the lower end of the rising pipe is as follows: $D2/D1 \cong 1.5–2.5$, particularly $D2/D2 \cong 2$.

This arrangement therefore represents a nozzle, wherein preferably the infeed tube has a conical nozzle section at its upper end. Such an arrangement leads to an especially efficient intake of the wort from the wort reservoir into the rising pipe. Caused by the reduced cross-section of the infeed tube, the flow speed of the wort is increased, wherein due to the low static pressure, wort is sucked into the rising pipe, wherein subsequently the wort expands in the upwardly expanding rising pipe. Particularly in combination with the expanding cross-sectional surface of the rising pipe a very favorable circulation can be achieved also during non-heated phases. A crustification of the external boiler can therefore effectively be prevented.

It is advantageous if the rising pipe has a preferably annular screen at its upper end, said screen extending around the periphery of the rising pipe. The screen surface is for instance inclined from an upper end of the rising pipe downwards. Thus, the wort upwardly emerging from the rising line or rising pipe can be deflected laterally, which enlarges the surface of the wort, which finally enhances the elimination of undesired components. A conducting body having a deflector is preferably provided above the rising pipe. The wort can emerge through the gap between the screen surface and the conducting body.

The structure according to the disclosure allows that the rising line or the rising pipe can be attached to the wort copper bottom in a simple manner by means of attachment elements.

The intake openings are preferably located in the lower third of the wort copper. Thus, a sufficient circulation is also possible in the bottom portion and bottom corner portion of the wort copper so that the efficiency of the process can be optimized.

BRIEF DESCRIPTION OF THE DRAWINGS

The present disclosure will now be explained with reference to the following drawings.

DETAILED DESCRIPTION OF THE PREFERRED EMBODIMENT

Figure 5:
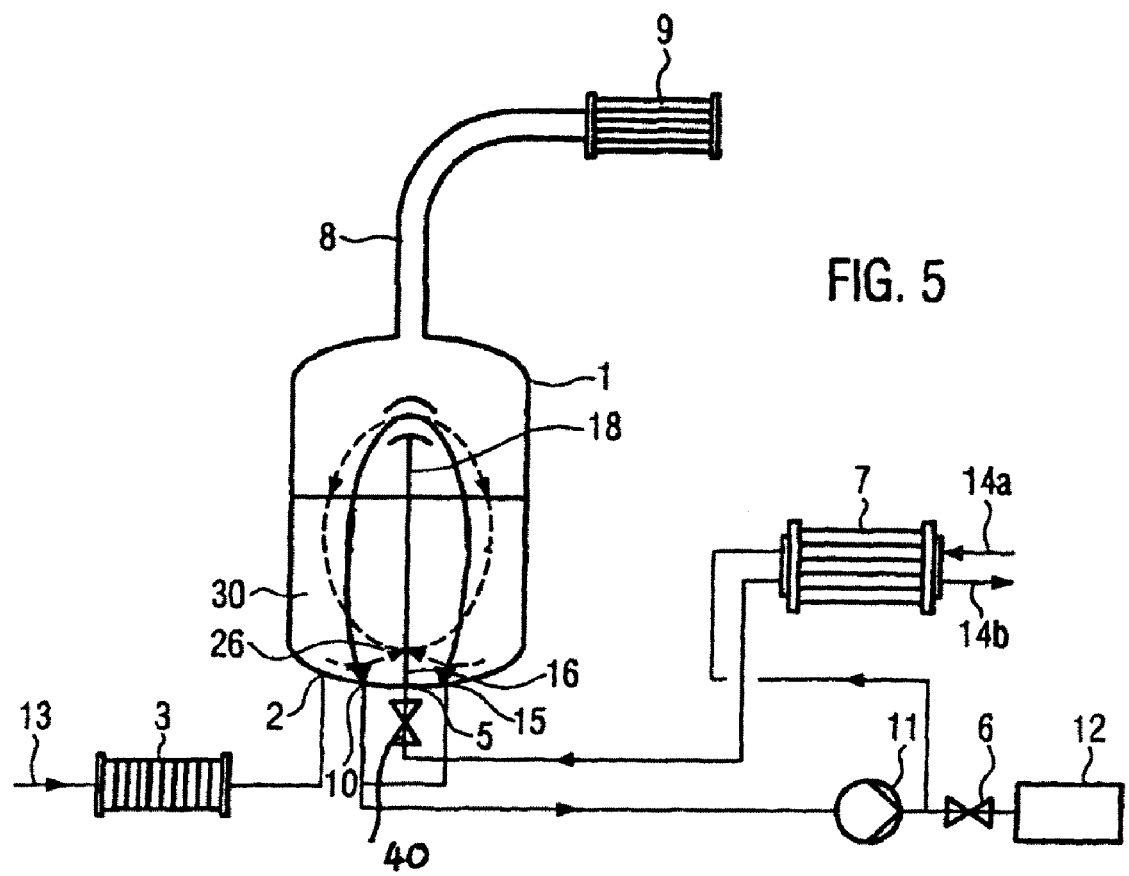

FIG. 5 shows the wort copper 1 according to the disclosure, which comprises an inlet for the wort 2. The wort copper is supplied via the inlet 2 from the lauter tub or a presettling tank (not shown) via line 13 and an optionally provided wort heating device 3 to the wort for boiling. The external boiler 7 is for instance a tubular heat exchanger or a plate heat exchanger. The size and power of the external boiler 7 can be freely selected depending on the wort volume in the wort copper 1 and the desired boiling process, since the size of the external boiler 7 is not limited to the space existing in the wort copper, as is for instance the case in wort coppers with an internal boiler. The external boiler 7 is operated by hot vapor or high pressure hot water and comprises for this purpose a supply pipe 14a and a return pipe 14b. The external boiler 7 is controlled by a control means, which is not shown, so that the wort can be heated phase-wise with different power. The wort copper 1 comprises at least one wort outlet 10, 15, which is provided in the copper bottom. The wort outlet 10, 15 is located preferably in the copper bottom 23, however, in any case below the surface of the wort reservoir 30.

In this embodiment, a wort outlet 10 and a wort outlet 15 exist, which are both joined.

The wort is supplied from the wort reservoir 30 to the external boiler via the wort outlet 10, 15 by means of a pump 11, preferably having a frequency converter.

The wort, which ran through the external boiler 7 and which was heated during the heated phase by the external boiler 7 e.g. to a temperature of above 100° C. is supplied via a further line to the wort supply 5 in the wort copper 1 and rises upwards there, as will be explained further below, through the infeed tube 16 and the rising pipe 18 in the wort copper, and reaches via the upper end of the rising pipe 18 to the surface of the wort reservoir 30. From the wort reservoir 30 the wort can, as described above, be returned via the wort outlet 10, 15 to the external boiler 7 in the cycle. Furthermore, the ready boiled wort can be supplied via the wort outlet 10, 15 by means of the pump 11 e.g. to a whirl pool for hot break deposition by switching valve 6. At the upper end, i.e. the end opposing the discharge, the wort copper 1 comprises an outlet vent 8 through which the vapor generated is discharged and is for instance supplied to a vapor condenser 9.

Figure 1:
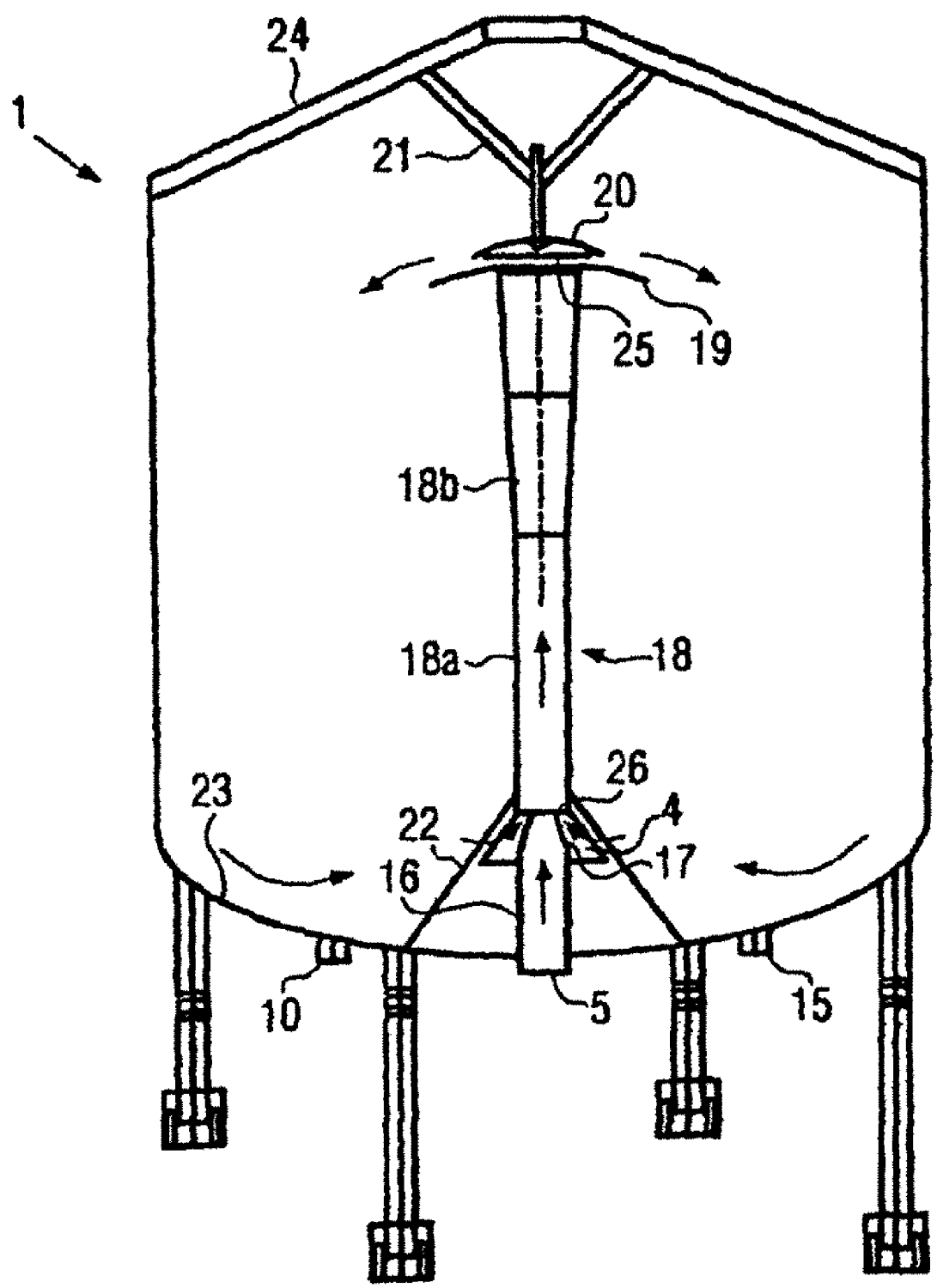
FIG. 1 schematically shows a longitudinal section of the embodiment of the present disclosure.

In FIG. 1 the wort copper 1 as well as the infeed tube and the rising pipe 16, 18 can be recognized in a clearer way. The wort supply 5, which re-supplies wort heated by the external boiler 7 to the wort copper 1 is connected to the intake tube 16, 18. The wort supply 5 and the intake tube is arranged in the copper bottom, however, it can also be arranged in the side wall of the copper. The wort supply should, however, be arranged such that the intake opening 26 is substantially arranged in the lower third of the copper. In this embodiment the rising pipe is formed in two pieces, which, however, is not inevitably required. The infeed tube and the rising pipe 18 are arranged centrically. The infeed tube 16 is attached in the wort copper bottom 23. The rising pipe 18 is also attached at the copper bottom 23 via supports 22.

Figures 4A, 4B, 4C:
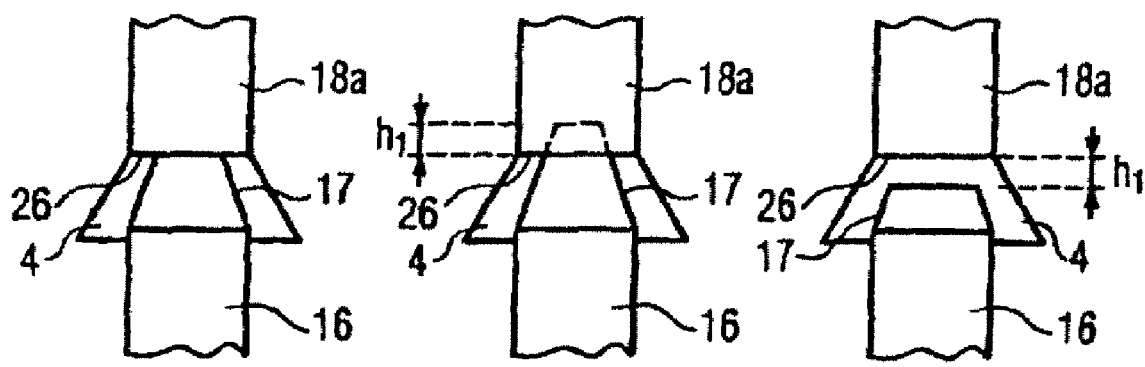
Figure 6:
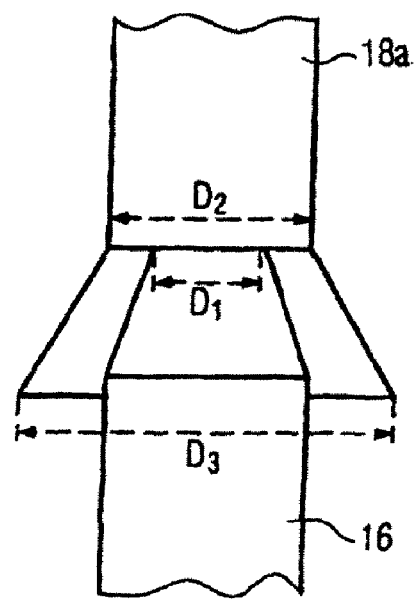
FIG. 6 shows the section shown in FIG. 4a with a respective dimensioning.
Figure 7:
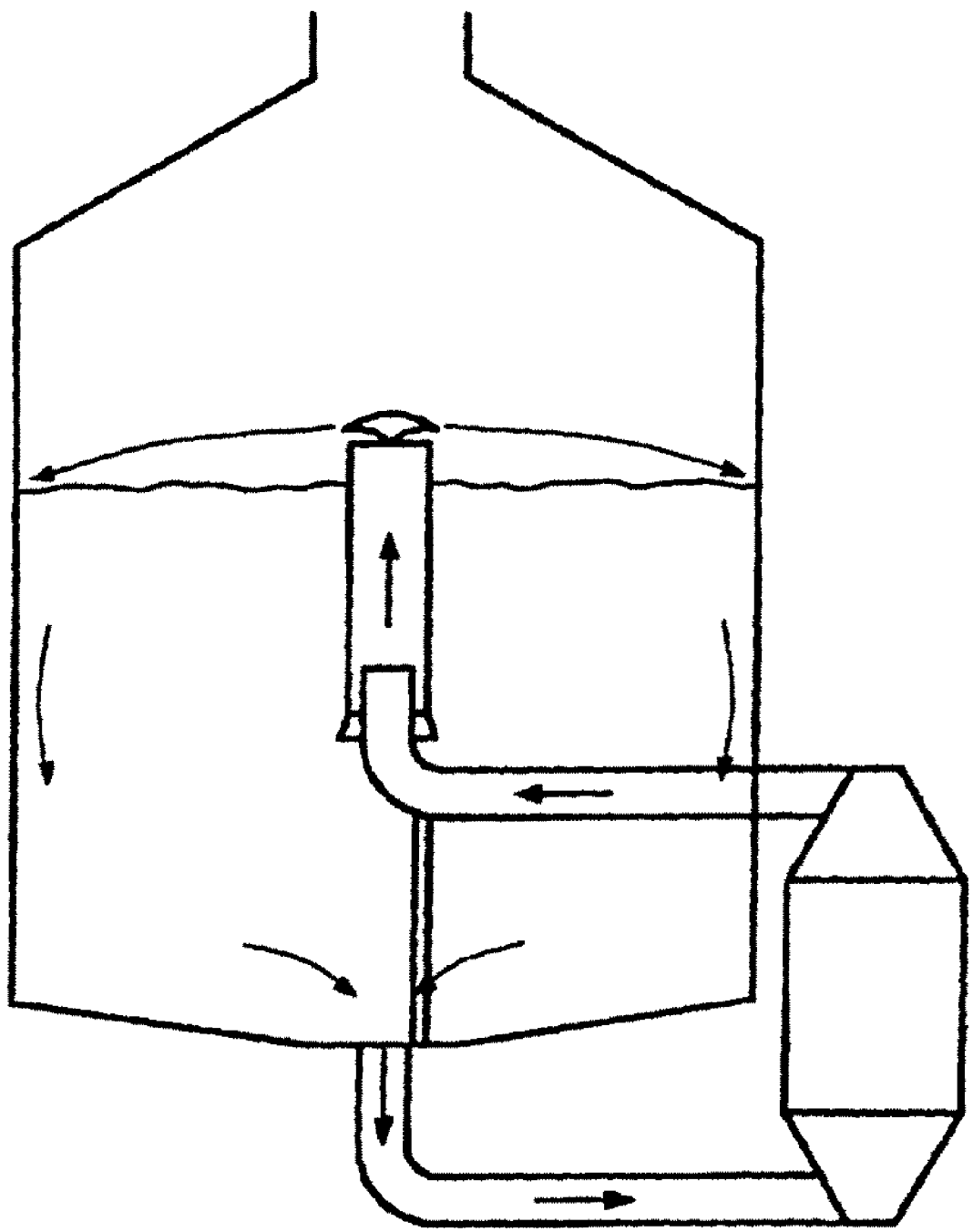
FIG. 7 shows a wort copper according to the prior art.

In this embodiment, the infeed tube 16 abuts on the lower end portion of the rising pipe 18, as may for instance also be seen from FIGS. 4a and 4c. In this case, the infeed tube 16 has a lower cross-sectional surface on its upper end than the rising pipe 18 on its lower end. A downwardly expanding laterally closed collar is provided at the lower end of the rising pipe 18a. The infeed tube 16 projects into the collar 4. As may better be seen from FIG. 6, the infeed tube 16 has a diameter D1 at its upper end, i.e. at its upper edge, and the rising pipe 18 has a diameter D2 at its lower end or in this case in the entire section 18a, wherein the ratio of the diameters of the infeed tube at its upper end D1 to the diameter D2 at the lower end of the rising pipe is as follows: $D2/D1 \cong 1.5$ to 2.5, particularly $D2/D1 \cong 2$. The diameter D3 of the collar at its end facing the inlet 5 is designated by D3, wherein the ratio of D3/D2 is in a range of 1.5 to 2.5, preferably $\cong 2$.

In FIG. 4a, the upper end, i.e. in this case the upper edge of the infeed tube 16 and the lower end, i.e. e.g. the lower edge of the rising pipe 18a, are located substantially on one plane. The upper end of the infeed tube 16 can, however, also slightly project into the rising pipe 18 in the lower portion, as it is shown in FIG. 4b or it may be slightly spaced apart therefrom towards the bottom, as shown in FIG. 4c. The infeed tube 16 may for instance project into the rising pipe 18 by a distance $h_1$, wherein $h_1 < D1 \pm 10\%$. This also applies to the distance $h_1$, as it is shown in FIG. 4c, between the lower end of the rising pipe 18 and the upper end or the upper edge of the infeed tube 16. However, the infeed tube 16 must not project further into the rising pipe 18 or be spaced apart therefrom, since then the intake function of the rising pump is no longer guaranteed, as will be explained further below.

In this embodiment, the infeed tube 16 has a conically tapering nozzle section 17 at its upper end, so that by a constriction of the cross-section the speed of the wort flowing through or the dynamic pressure increases and the static pressure decreases. Thereby, at least one intake opening 26 formed annularly in this case forms between the lower end of the rising pipe 18 and the upper end or the outer wall of the infeed tube 16. Due to the low static pressure, wort can autonomously be sucked in via the intake opening 26 from the wort reservoir 30 into the rising pipe 18, as indicated by the arrows in FIGS. 1 and 5. The wort sucked-in then rises together with the wort heated by the external boiler 7 upwards in the rising pipe 18, as shown by the arrow in FIG. 1.

The rising pipe 18 is formed such that it expands at least section-wise towards the top, i.e. in the rising direction of the wort. In this case, the rising pipe 18 first of all has a cylindrical section 18a, to which a conically expanded section 18b is connected, as may be seen in FIG. 2, whose cross-section enlarges towards the end of the rising pipe 18. In the non-expanded section 18a of the rising pipe, the dynamic pressure of the rising wort is high and thus also the flow speed. The section 18a can therefore also be designed as speed portion. The upper section 18b is formed as a conically tapering tube rotational symmetric around the longitudinal axis L, whose outer wall is inclined at an angle β of 5 to 15°, preferably 6 to 10° with respect to the center axis L, as becomes clear from FIG. 2. The extension of the rising pipe 18 above the intake opening 26 leads to the advantage that the rising wort can expand, which in turn enhances the circulation, i.e. the intake of wort. The lengths of the sections 18a and 18b are preferably essentially equally large and deviate from one another at most by 25% to 50%.

Figure 2:
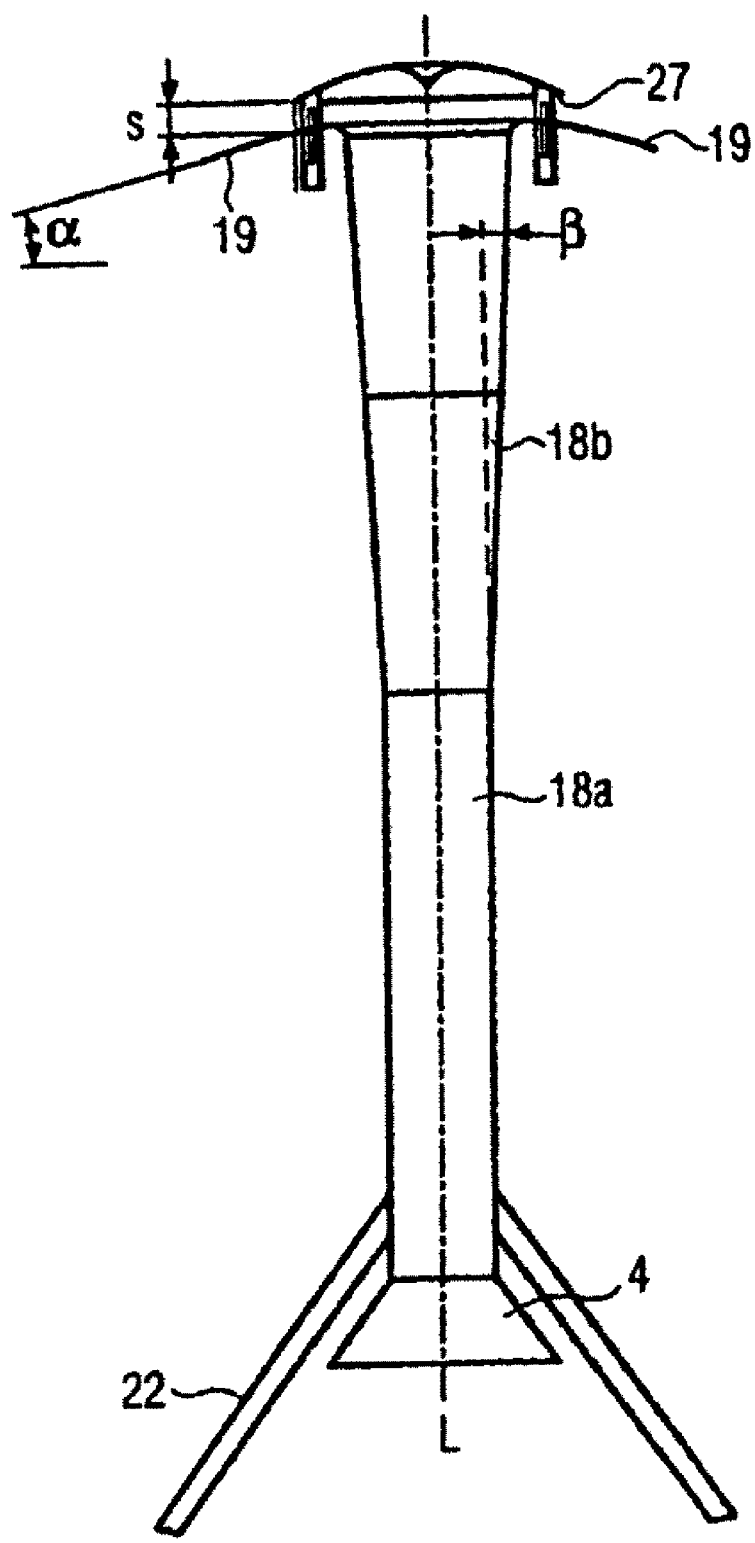
FIG. 2 shows a longitudinal section of a rising pipe according to the present invention.
Figure 3:
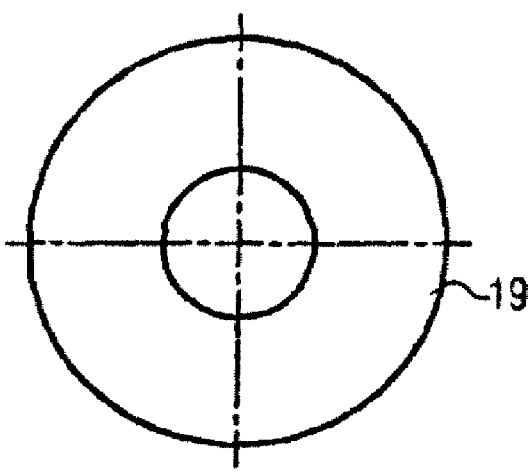
FIG. 3 shows a top plan view onto a screen attached at the top of the rising pipe, FIG. 4a schematically shows a section showing the transition between the infeed tube and the rising pipe according to the present disclosure, FIG. 4b schematically shows the transition between the infeed tube and the rising pipe according to the present disclosure, FIG. 4c schematically shows the transition between the infeed tube and the rising pipe, FIG. 5 schematically shows the wort copper with the external boiler.

At the upper end of the rising pipe 18 an annular screen 19 is arranged around the rising pipe 18, as may particularly be seen from FIGS. 2 and 3. The screen is preferably arranged annularly at the periphery of the rising pipe. The screen surface is inclined from the upper end of the rising pipe 18 downwardly at an angle α=10 to 40°, preferably 20 to 30° with respect to the horizontal. The conducting body 20 is arranged opposite to the rising pipe 18, said conducting body having a substantially concave swirl surface 29. The conducting body 20 projects laterally up into the portion of the screen 19 so that the outlet gap S is formed between the conducting body 20 and the screen, through which said gap the wort is conducted towards the outside. In this embodiment the gap is annular. The gap height may for instance be varied by the device shown in FIG. 2, particularly the adjusting screw device 27. Thus, the wort can be conducted to the outside as a thin film and may impinge from there onto the surface of the wort reservoir 30. Caused by the enlarged surface, undesired substances, such as DMS can be removed. The conducting body 20 is arranged through an attachment 21 at the upper part of the wort copper 1, preferably at the hood 24.

The intake openings 26 are preferably arranged in the lower third of the wort copper 1 so that a sufficient circulation of the wort in the lower portion of the wort copper is possible. As indicated by the arrows, the wort can particularly be sucked-in by the intake openings 26 also from the lower corner portions of the wort copper 1. In this connection, it is particularly advantageous that also the wort outlet 10, 15 is provided in the lower portion, i.e. in this case in the copper ground 23 so that the wort copper 1 can also be used in the case of small wort volumes or small brews.

As may be derived from FIG. 5, an actuator valve 40 is provided in front of the inlet 5. The speed or the pressure of the rising wort can be adjusted by means of this actuator valve so that the speed of the wort is approximately 2 to 3 m/sec. In any case, the pressure of the rising wort must at least correspond to the saturation vapor pressure of the wort that corresponds to the temperature of the wort heated by the external boiler 7 and it must correspond to the static pressure of the wort above the valve 40, i.e. in the rising pipe and the infeed tube.

The method according to the disclosure will now be explained in more detail for the wort copper shown in connection with FIG. 1 to 5.

First of all, the wort to be boiled can be conducted via a line 13 from the lauter tub or the presettling tank to a wort heating device 3, which pre-heats the wort. However, the wort does not have to be pre-heated. The wort is then conveyed via an inlet 2 into the wort copper 1 until a certain wort reservoir 30 is stored in the wort copper 1. Wort is then conveyed to the external boiler 7 from the wort copper 1 of the wort reservoir 30 via the wort outlet 10, 15 and the pump 11 (valve 6 closed). There, the wort is heated to temperatures above 100°, preferably 101-104° C. The wort heated by the external boiler 7 is then again supplied to the wort copper from below via the wort supply 5. The wort heated by the external boiler passes the infeed tube 16 and rises upwards, as shown in FIG. 1, in the direction of the arrow. Due to the conically tapering nozzle sections 17 of the infeed tube 16, the flow speed of the wort is increased caused by the cross-sectional constriction in a manner that the dynamic pressure rises and the static pressure drops. The wort passes the conical nozzle section 17 and rises upwards into the rising pipe 18. Due to the low static pressure of the flowing liquid, wort is sucked in automatically into the rising pipe 18 through the intake opening 26 from the wort reservoir 30, as it is shown by the dotted arrows in FIG. 1. Thus, the wort is also set in motion in the lower area of the wort copper 1 and circulates. The sucked-in wort then rises together with the wort heated by the external boiler 7 in the rising pipe 18, e.g. first of all in the cylindrically formed section 18a, and then upwards in the upwardly expanding section 18b. Caused by the fact that the rising pipe 18 expands in the rising direction, the heated wort can further expand in the rising pipe 18, which in turn favors the circulation of the wort. At the upper end of the rising pipe 18, the wort impinges on the conducting body 20 and is guided laterally downwards through the gap S formed between the conducting body or conducting screen 20 and the screen 19, wherein the surface of the liquid emerging is enlarged, which in turn enhances evaporation of undesired aromatic components, e.g. DMS. The wort then runs downward and falls onto the surface of the wort reservoir 30. Thus, two cycles exist, as is particularly shown in FIG. 5. In one cycle the wort circulates through the outlet 10, 15, the external boiler 7, the wort supply 5 and the rising pipe 16, 17 as well as the wort reservoir 30 in the cycle, as it is shown by the straight arrows.

On the other hand, a further cycle results, which is shown in FIG. 5 in dotted lines, wherein the wort is sucked in via the at least one intake opening 26 into the rising pipe 18, rises upward, is re-supplied to the wort reservoir 30 and is sucked in again through the intake opening 26.

This principle leads to the advantage that particularly in the lower bottom portion of the wort copper a sufficient circulation of the wort is ensured. The skilful arrangement and the advantageous structure of the rising line, i.e. the rising pipe and the infeed tube above that leads to the advantage that during non-heated phases, i.e. when the wort is drawn off via the wort outlet 10, 15 through the pump 1, but is not or only moderately heated and then re-supplied through the infeed tube 16, a sufficient circulation in the wort copper 1 can be realized, even if a large thermal relief energy does not exist. On the whole the pumping capacity, the heating capacity and the process duration can be optimized by the present disclosure.

Since between 2 to 4% of the wort volume evaporates, the exhaust vapors can be discharged via the outlet vent 8 and may be supplied to a condenser 9.

In this embodiment, the wort copper with a rising line was described, which is formed of two pieces. However, it is also possible to form the rising line in one piece with respective intake openings 26. In the embodiment, as it is shown in FIGS. 1 and 2, the rising pipe 18 has a cylindrical section 18a and a conically expanding section 18b arranged above the cylindrical section 18a. It is essential that wort in the rising pipe can expand upwardly, wherein in this embodiment a speed increase takes place in section 18a, and the speed is reduced in section 18b by volume enlargement.

The invention claimed is:

1. Wort copper (1) comprising an external boiler (7) arranged outside of the wort copper (1), the external boiler cyclically heating wort from the wort copper (1), wherein the heated wort is re-supplied to the wort copper (1),
   an infeed tube (16) as well as a rising pipe (18) arranged above the infeed tube (16), through which said rising pipe wort in the wort copper (1) heated by the external boiler (7) rises upwards,
   the upper end of the infeed tube (16) abutting at a lower end portion of the rising pipe (18) in a manner that at least one intake opening (26) is formed between the infeed tube (16) and the rising pipe (18) for sucking in wort from a wort reservoir (30) of the wort copper, and wherein the cross-sectional surface of the rising pipe enlarges at least section-wise towards an upper end of the rising pipe (18) that includes a conically tapering tube whose outer wall is inclined at an angle $\beta \geqq 5°$ with respect to a central axis L of the rising pipe.

2. Wort copper according to claim 1, and wherein a downwardly expanding collar (4) is provided at the lower end of the rising pipe (18).

3. Wort copper according to claim 1, wherein the rising pipe (18) comprises a non-expanding lower section (18a) and an upper section (18b) whose cross-sectional surface area enlarges towards the upper end of the rising pipe (18), the upper section including the conically tapering tube.

4. Wort copper according to claim 3, wherein the angle $\beta$ is in a range from 5° to 15° with respect to the central axis L.

5. Wort copper according to claim 1, wherein the infeed tube (16) has a lower cross-sectional surface at its upper end than the lower end of the rising pipe (18).

6. Wort copper according to claim 5, wherein the ratio of the diameters (D1) of the infeed tube (16) at its upper end to the diameter (D2) at the lower end of the rising pipe 18 is as follows: D2/D1 is approximately equal to 1.5 to 2.5.

7. Wort copper according to claim 1, wherein the infeed tube (16) comprises nozzle sections (17) conically tapering an upper end of the infeed tube.

8. Wort copper according to claim 1, wherein the at least one intake opening (26) is arranged in the lower third of the wort copper.

9. Wort copper according to claim 1, wherein a rising line (16, 18) has a circumferential screen (19) on its upper end.

10. Wort copper according to claim 9, wherein the screen (19) has an annular screen surface inclined from the upper end of the rising line (16, 18) towards the bottom.

11. Wort copper according to claim 1, wherein a conducting body (20) is arranged above the rising pipe (18, 16).

12. Wort copper according to claim 1, wherein the rising pipe (18) is attached to the wort copper bottom (23) through attachment elements (22).

13. Method for boiling wort using a wort copper (1), comprising:
   cyclically heating wort from a wort copper (1) by an external boiler (7), resupplying the heated wort to the wort copper (1),
   the wort heated by the external boiler (7) rises upwards into the wort copper (1) through an infeed tube and a rising pipe (18) arranged above the infeed tube and runs down from an upper end of the rising pipe (18) to a wort reservoir (30) in the wort copper, and
   automatically sucking in wort from the wort reservoir (30) into the rising pipe (18) via at least one intake opening (26) between the infeed tube (16) and the rising pipe (18), said sucked-in wort rising upward together with the wort heated by the external boiler, wherein the uprising wort expands in an upper end of the rising pipe (18), wherein the cross-sectional surface of the upper end enlarges at least section-wise and includes a conically tapering tube having a wall inclined at an angle $\beta \geqq 5°$ with respect to a central axis of the rising pipe.

14. Method according to claim 13, and wherein a reduction of the cross-sectional surface of the infeed tube (16) causes the flow speed of the wort to be increased and the static pressure to be reduced.

15. Method according to claim 13, wherein the uprising wort in the rising pipe (18) first flows through a lower section (18a), which does not expand, and then flows through an upper section (18*b*) expanding towards the upper end of the rising pipe, and which includes the conically tapering tube.

16. Wort copper according to claim 4, wherein the angle β is in a range from 6° to 10°.

17. Wort copper according to claim 6, wherein the ratio of the diameter is: D2/D1 is approximately equal to 2.

* * * * *